United States Patent
Li et al.

(10) Patent No.: US 11,204,286 B2
(45) Date of Patent: Dec. 21, 2021

(54) SINGLE MODE FIBER DISTRIBUTED TEMPERATURE SENSING WITH IMPROVED NOISE CHARACTERISTICS

(71) Applicant: NEC Laboratories America, Inc., Princeton, NJ (US)

(72) Inventors: Yaowen Li, Princeton, NJ (US); Ming-Fang Huang, Princeton, NJ (US); Shuji Murakami, Monmouth Junction, NJ (US); Philip Ji, Cranbury, NJ (US); Ting Wang, West Windsor, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 16/879,876

(22) Filed: May 21, 2020

(65) Prior Publication Data
US 2021/0199512 A1    Jul. 1, 2021

Related U.S. Application Data

(60) Provisional application No. 62/851,144, filed on May 22, 2019.

(51) Int. Cl.
| H04B 10/08 | (2006.01) |
| G01K 11/324 | (2021.01) |
| H04B 10/2507 | (2013.01) |
| H04B 10/50 | (2013.01) |

(52) U.S. Cl.
CPC ..... G01K 11/324 (2021.01); H04B 10/25073 (2013.01); H04B 10/502 (2013.01); H04B 10/504 (2013.01)

(58) Field of Classification Search
CPC .............. H04B 10/071; H04B 10/0775; H04B 10/0771; H04B 10/0791; H04B 10/0795; H04B 10/0793; H04B 10/40; H04B 10/502; H04B 10/504; H04J 14/02; G01K 11/32; G01K 11/324; G01K 11/3206; G01D 5/35361; G01D 5/35364
USPC ........ 398/16, 13, 17, 20, 21, 25, 30, 31, 32, 398/33, 38, 79, 135, 136, 159; 374/161, 374/131, 130, 137; 356/73.1
See application file for complete search history.

(56) References Cited

U.S. PATENT DOCUMENTS

| 8,152,370 B2 * | 4/2012 | Martinelli | G01K 11/32 374/161 |
| 10,634,553 B1 * | 4/2020 | Hveding | G01D 5/35361 |
| 2007/0229816 A1 * | 10/2007 | Chen | G01K 11/32 356/301 |
| 2013/0156066 A1 * | 6/2013 | Kwon, II | G01K 11/32 374/161 |
| 2016/0018272 A1 * | 1/2016 | Nishio | G01K 15/005 374/1 |

* cited by examiner

*Primary Examiner* — Hanh Phan
(74) *Attorney, Agent, or Firm* — Joseph Kolodka

(57) ABSTRACT

Aspects of the present disclosure describe single mode fiber distributed temperature sensing (DTS) with improved noise characteristics employing superluminescent emitting diodes (SLEDs) and/or amplified spontaneous emission (ASE) light sources.

3 Claims, 11 Drawing Sheets

SINGLE MODE FIBER DISTRIBUTED TEMPERATURE SENSING WITH IMPROVED NOISE CHARACTERISTICS

CROSS REFERENCE

This disclosure claims the benefit of United States Provisional Patent Application Ser. No. 62/851,144 filed May 22, 2019 the entire contents of which is incorporated by reference as if set forth at length herein.

TECHNICAL FIELD

This disclosure relates generally to distributed temperature sensing systems, methods, and structures. More particularly, it describes single mode fiber distributed temperature sensing exhibiting improved noise characteristics.

BACKGROUND

Distributed temperature sensing (DTS) systems utilizing optical fiber cable as a linear sensing medium has found widespread applicability in numerous industrial segments in including oil and gas production, power cable and transmission line monitoring, fire detection, and temperature monitoring in plant and process engineering. While a majority of DTS systems employ multi-mode optical fiber as sensing medium, there nevertheless are DTS systems that utilize single mode optical fiber as the sensing medium.

A noted problem with such single mode DTS systems, however, is that they suffer from temperature noise originating from their light source(s).

SUMMARY

The above problem is solved and an advance in the art is made according to aspects of the present disclosure directed to Raman-based systems, methods, and structures for distributed temperature sensing using single mode optical fiber as sensing medium.

In sharp contrast to the prior art—systems, methods, and structures according to aspects of the present disclosure achieve single mode fiber distributed temperature sensing (DTS) with improved noise characteristics by employing lowly polarized superluminescent emitting diodes (SLEDs) and/or unpolarized amplified spontaneous emission (ASE) light sources.

BRIEF DESCRIPTION OF THE DRAWING

A more complete understanding of the present disclosure may be realized by reference to the accompanying drawing in which.

Figure 1:
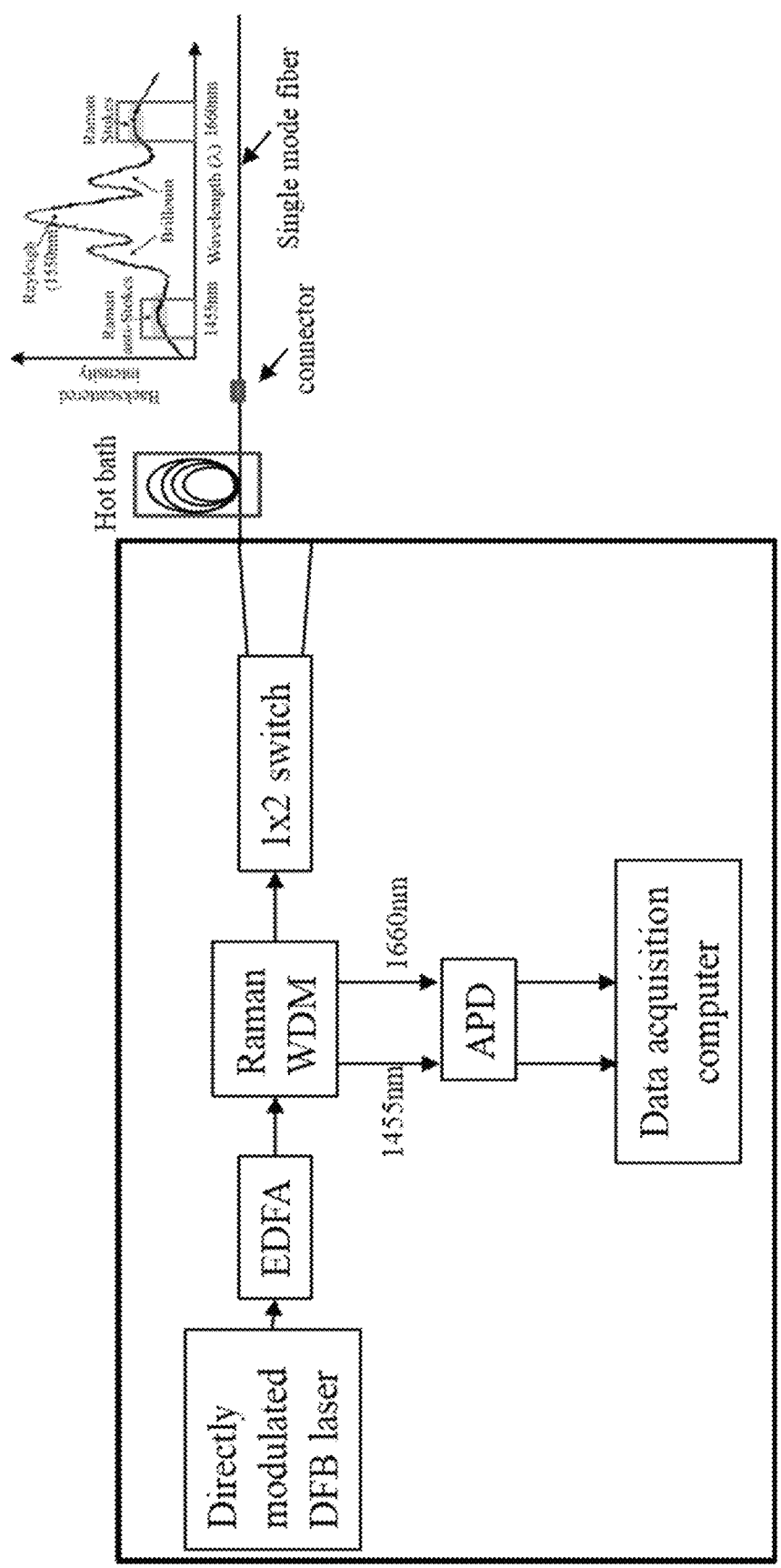
FIG. 1 shows a schematic diagram illustrating a prior art single mode fiber DTS configuration.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that Raman-based, distributed temperature sensing (DTS) systems employing single mode optical fiber oftentimes experience undesirable signal to noise ratios including high frequency noise(s). In response, averaging, optical coding/ decoding and denoising techniques have been employed to mitigate such undesirable characteristics.

We have discovered that—unfortunately—these mitigation techniques have proven largely ineffective at eliminating temperature noise generated by light source(s) characteristics—especially its coherence.

FIG. 1 shows a schematic diagram illustrating a prior art single mode fiber, single ended DTS configuration that is subject to the type(s) of noise problems noted above. Also shown in FIG. 1 is an illustrative Backscattered light Intensity vs. Wavelength.

With simultaneous reference to those figures, it may be observed that a contemporary/common single mode fiber DTS configuration will typically include a directly modulated distributed feedback laser (DFB laser) the output of which is directed through an erbium-doped fiber amplifier (EDFA) to a Raman wavelength division multiplexer (WDM). The light through the WDM is then directed to a 1×2 optical switch and subsequently applied to the single mode fiber.

Operationally, and as will be readily appreciated by those skilled in the art, the DFB laser (1550 nm or other wavelengths) generates optical pulses having pulse width(s) of several nanoseconds to tens of nanoseconds. The EDFA amplifies the optical pulses which are then directed through the Raman WDM, the 1×2 switch and launched into the single mode optical fiber. In a typical configuration such as that shown, a first part of the fiber is used for calibration, and subsequent part(s) of the fiber provide temperature sensing function(s).

A spectrum of backscattered light with the launching light at 1550 nm is shown graphically in FIG. 1, and the backscattered light is filtered by the Raman WDM into two bands, namely 1455 nm and 1660 nm, and subsequently directs those bands to two high gain avalanche photodetector (APD) detectors. Output signals from the APDs are directed to a data acquisition system and computer for processing, evaluation, and temperature determination(s).

Figure 2:
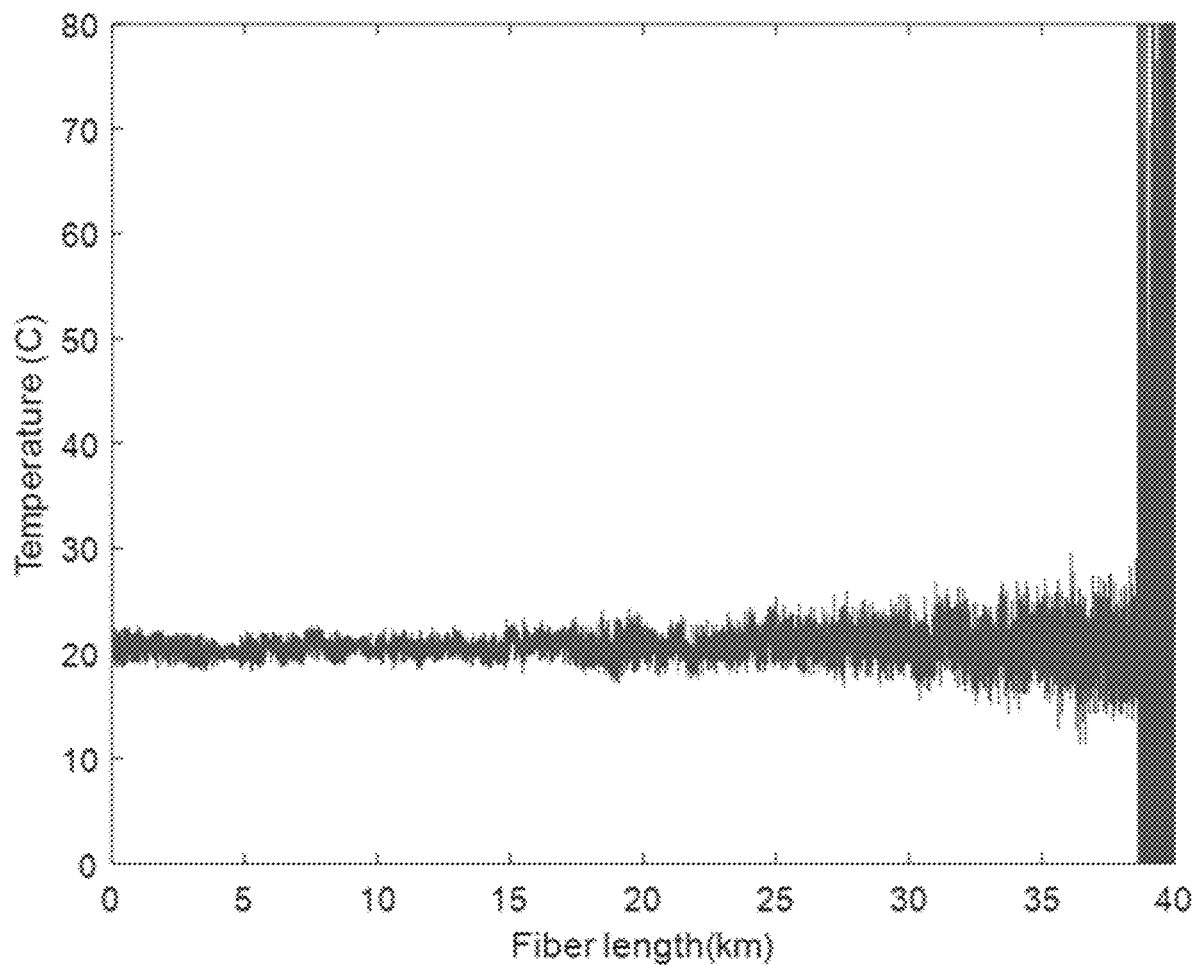
FIG. 2 is a plot of Temperature (° C.) vs. Fiber Length (km) resulting from single mode DTS having a directly modulated DFB source.
Figure 3:
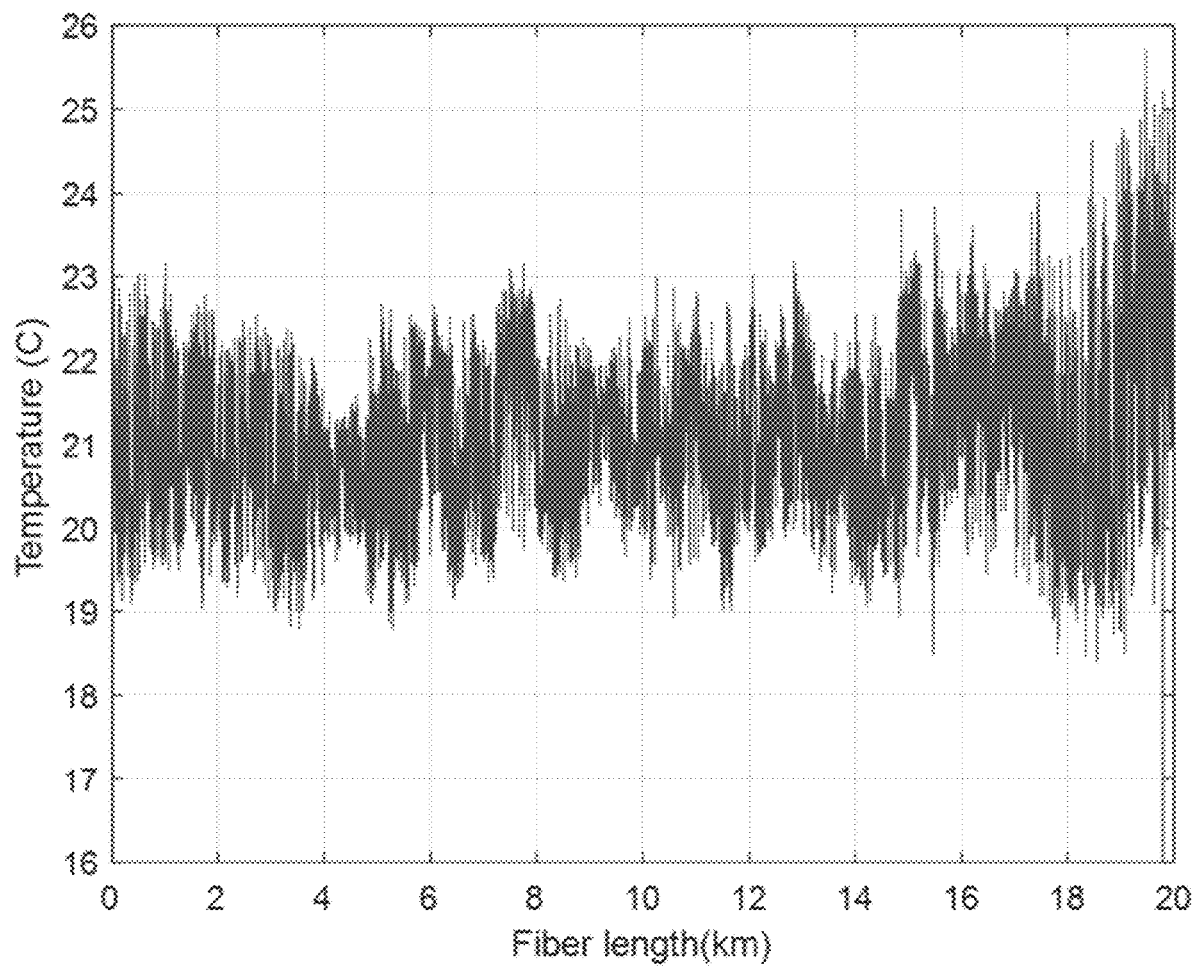
FIG. 3 is a plot of Temperature (° C.) vs. Fiber Length (km) showing an expanded view of the first 20 km result of FIG. 2.

FIG. 2 is a plot of Temperature (° C.) vs. Fiber Length (km) resulting from single mode DTS having a directly modulated DFB source such as that shown in FIG. 1 including ~40 km SMF28 optical fiber(s). For this plot, such fiber is maintained at substantially room temperature (~20 C) and averaging and wavelet denoising were used to process data. As we found, for the initial 10 to 20 km of fiber, the temperature noise is substantially +/−2 C as illustratively shown in FIG. 3, which is a plot of Temperature (° C.) vs. Fiber Length (km) showing an expanded view of the first 20 km result of FIG. 2. For lengths of fiber beyond that initial 20 km, the temperature noise may be observed to be increasing with increasing fiber length—which is normal as signal to noise ratio decreases with fiber length.

Figure 4:
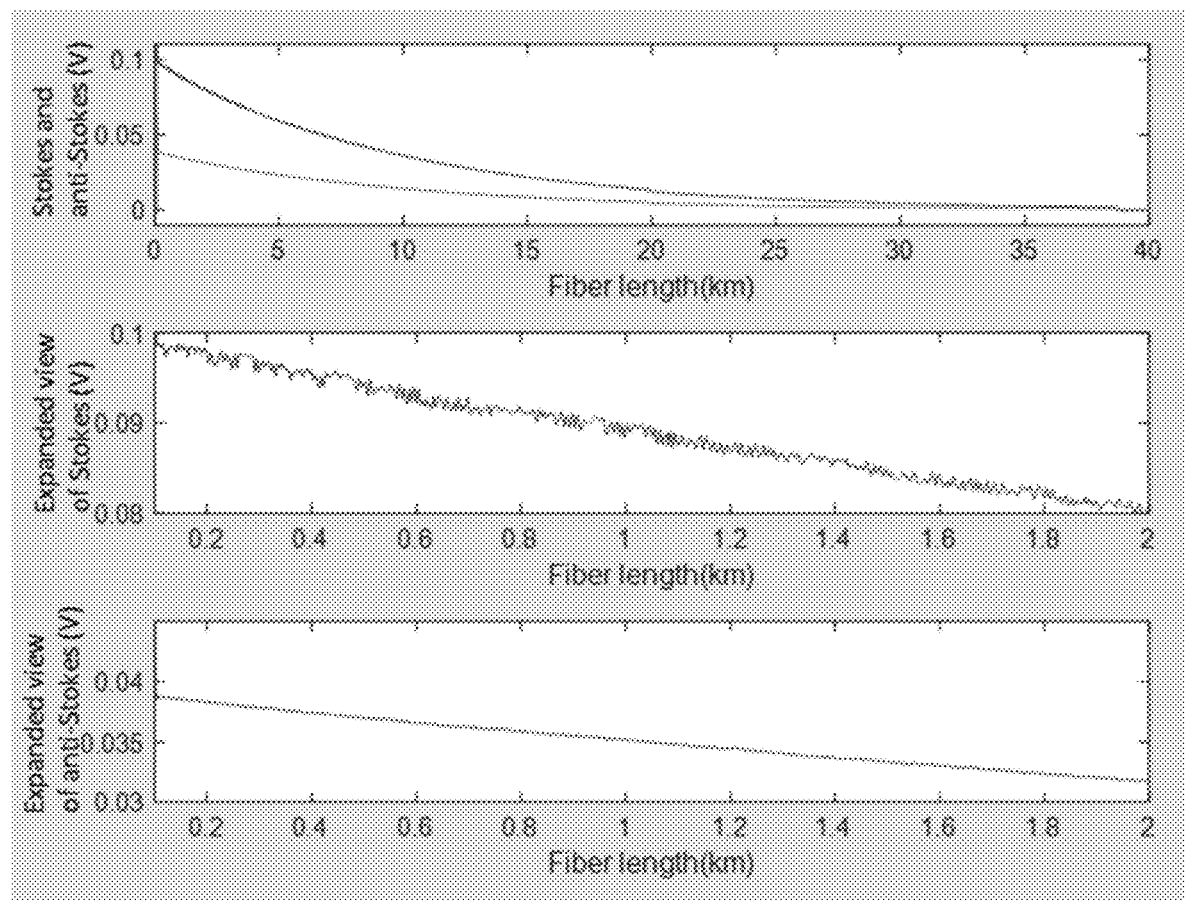
FIG. 4 is a series of plots of for Stokes and anti-Stokes measurements from the configuration illustrated in FIG. 1.

One may better understand our inventive concepts with examination of FIG. 4, which is a series of plots of for Stokes and anti-Stokes measurements from the configuration illustrated in FIG. 1. What one may observe from this figure is that most of the noise in the first 10 to 20 km of the fiber is from noise in the Stokes measurement. As may be observed, the Stokes measurement clearly shows large noise components while the anti-Stokes measurement is quite smooth—as indicated in the middle and bottom plots respectively. Note that such noise is like intra-pulse interference patterns observed in Rayleigh backscatter light.

To eliminate such undesirable noise—which may be related to source coherence—we designed three alternative system configurations employing lowly polarized superluminescent emitting diodes (SLEDs) and/or unpolarized amplified spontaneous emission (ASE) light sources. SLEDs are semiconductor devices that emit broadband light through electrical current injection. Three variations of our inventive concepts are shown schematically in FIG. 5, FIG. 6, and FIG. 7.

As those skilled in the art will readily appreciate ASE light sources are incoherent and unpolarized light sources, which combine high intensity—like lasers—with broad spectrum—like light emitting diodes (LEDs). SLEDs—sometimes referred to as SLDs—are considered by many as a hybrid between LEDs—which emit broadband light in all directions—and semiconductor laser diodes—which emit narrowband light with a well-defined laser beam. Broadband means that SLEDs emit an optical spectrum that is broad in the wavelength or frequency domain. The spatial domain is correlated to the frequency domain through a Fourier transform. A light source that is broadband in the frequency domain is therefore narrowband in the spatial domain—meaning it exhibits a short coherence length. (for some SLEDs, they are lowly polarized)

Figure 5:
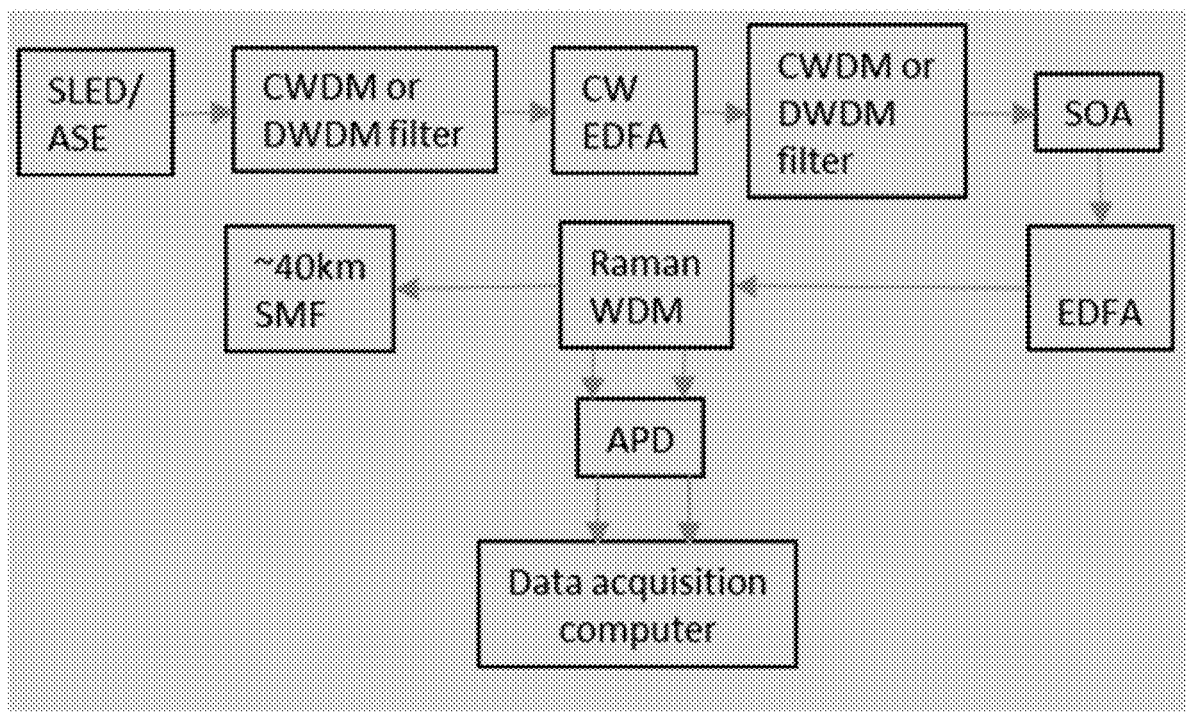
FIG. 5 shows a schematic diagram of a first illustrative configuration employing a CW SLED or ASE source and a CW EDFA before the pulse generation by the SOA for single mode fiber DTS according to aspects of the present disclosure.

FIG. 5 shows a schematic diagram of a first illustrative configuration employing a SLED or ASE source for single mode fiber DTS according to aspects of the present disclosure. As may be observed from that figure, an SLED or ASE is employed as a light source the output of which is directed to a coarse wavelength division multiplexing (CWDM) filter or a dense wavelength division multiplexing (DWDM) filter, to a CW erbium-doped fiber amplifier (CW EDFA), further to a CWDM or DWDM filter, a semiconductor optical amplifier (SOA) as a pulsing device, an EDFA, and finally to the Raman WDM which interacts with the single mode optical fiber sensing medium. We note further at this point that while our discussion has centered around SLED or ASE source(s), those skilled in the art will recognize and appreciate that our disclosure is not so limited. More particularly—besides ASE—there are other sources with these characteristics in the appropriate wavelength range(s)—for example—from certain types of lamps. And while such sources may exhibit less intensity density than ASE, with the configuration shown in FIG. 5, i.e., a CW EDFA to amplify the source—such alternative types of lamps should work as well.

Figure 6:
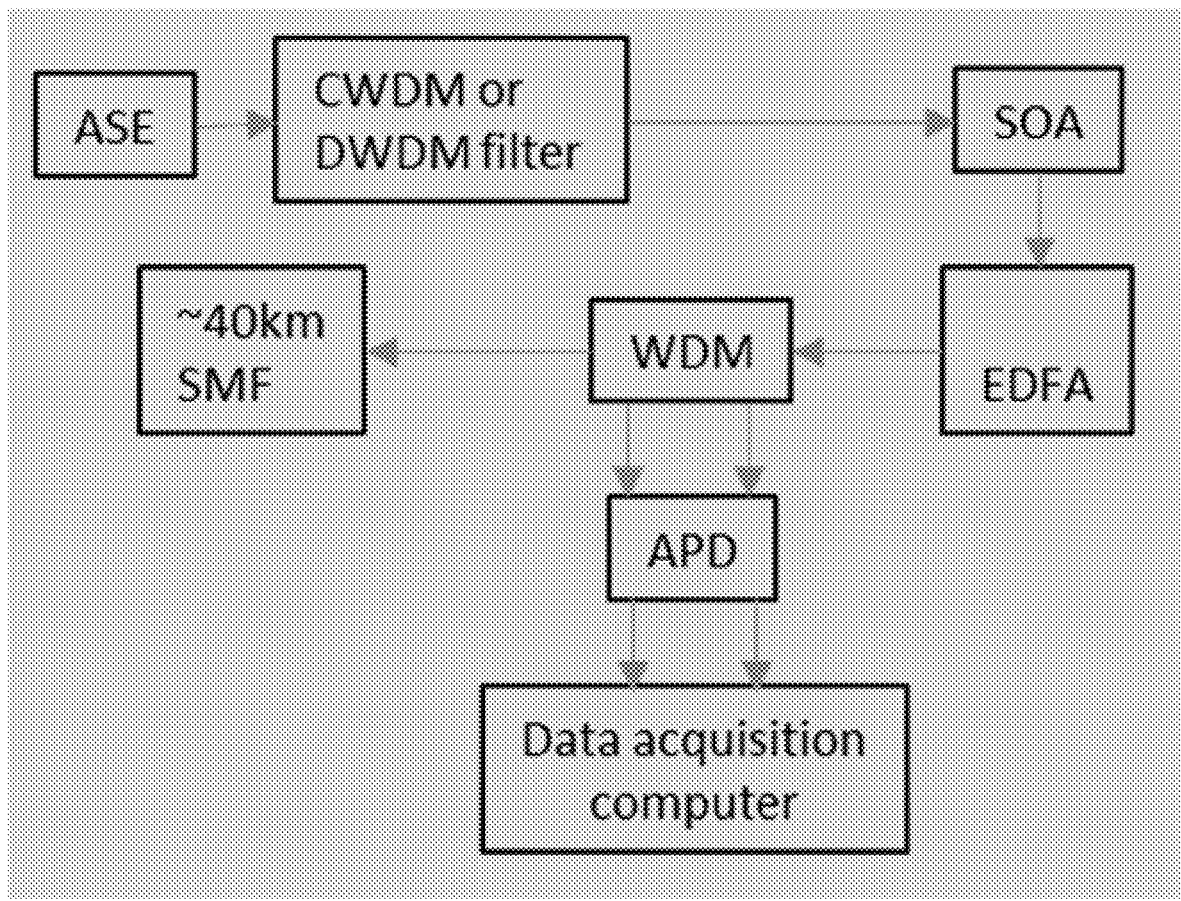
FIG. 6 shows a schematic diagram of a second illustrative configuration employing an ASE source without the CW EDFA for single mode fiber DTS according to aspects of the present disclosure.

FIG. 6 shows a schematic diagram of a second illustrative configuration employing an ASE source for single mode fiber DTS according to aspects of the present disclosure. In this figure, the CW EDFA and the second CWDM or DWDM filter(s) are eliminated from the arrangement of FIG. 5.

Figure 7:
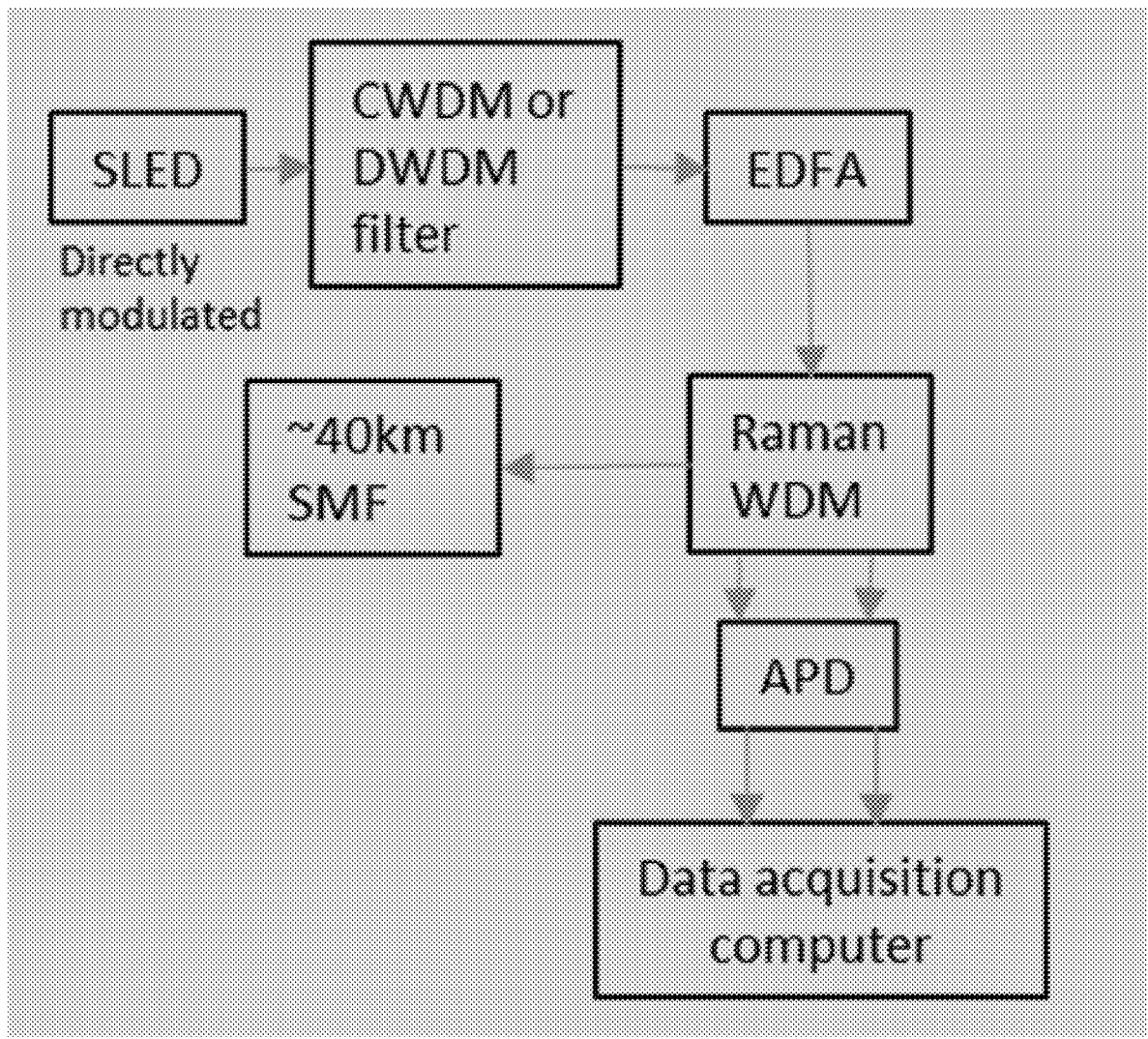
FIG. 7 shows a schematic diagram of a third illustrative configuration employing a directly pulsed SLED without the CW EDFA and SOA for single mode fiber DTS according to aspects of the present disclosure.

FIG. 7 shows a schematic diagram of a third illustrative configuration employing a SLED source for single mode fiber DTS according to aspects of the present disclosure. In this figure, the SLED is directly modulated and the SOA is eliminated from the arrangement of FIG. 6.

Figure 8:
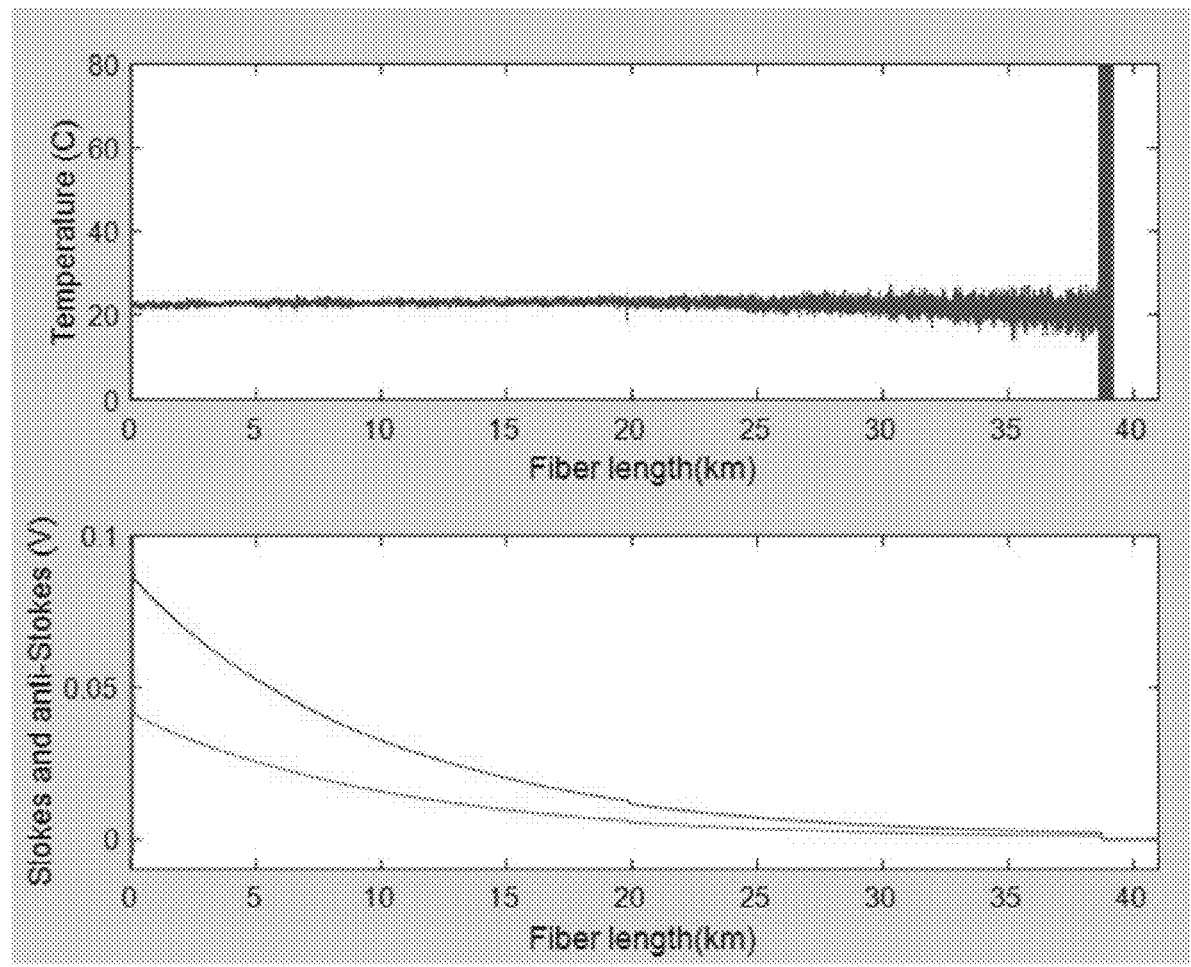
FIG. 8 is a pair of plots illustrating results produced from the configuration illustrated in FIG. 5 with an SLED and DWDM filters according to aspects of the present disclosure.

To evaluate our various configurations according to aspects of the present disclosure, the configuration of FIG. 5 employing a SLED and 100 GHz DWDM filter(s) was operated and results depicted in FIG. 8 were obtained.

Figure 9:
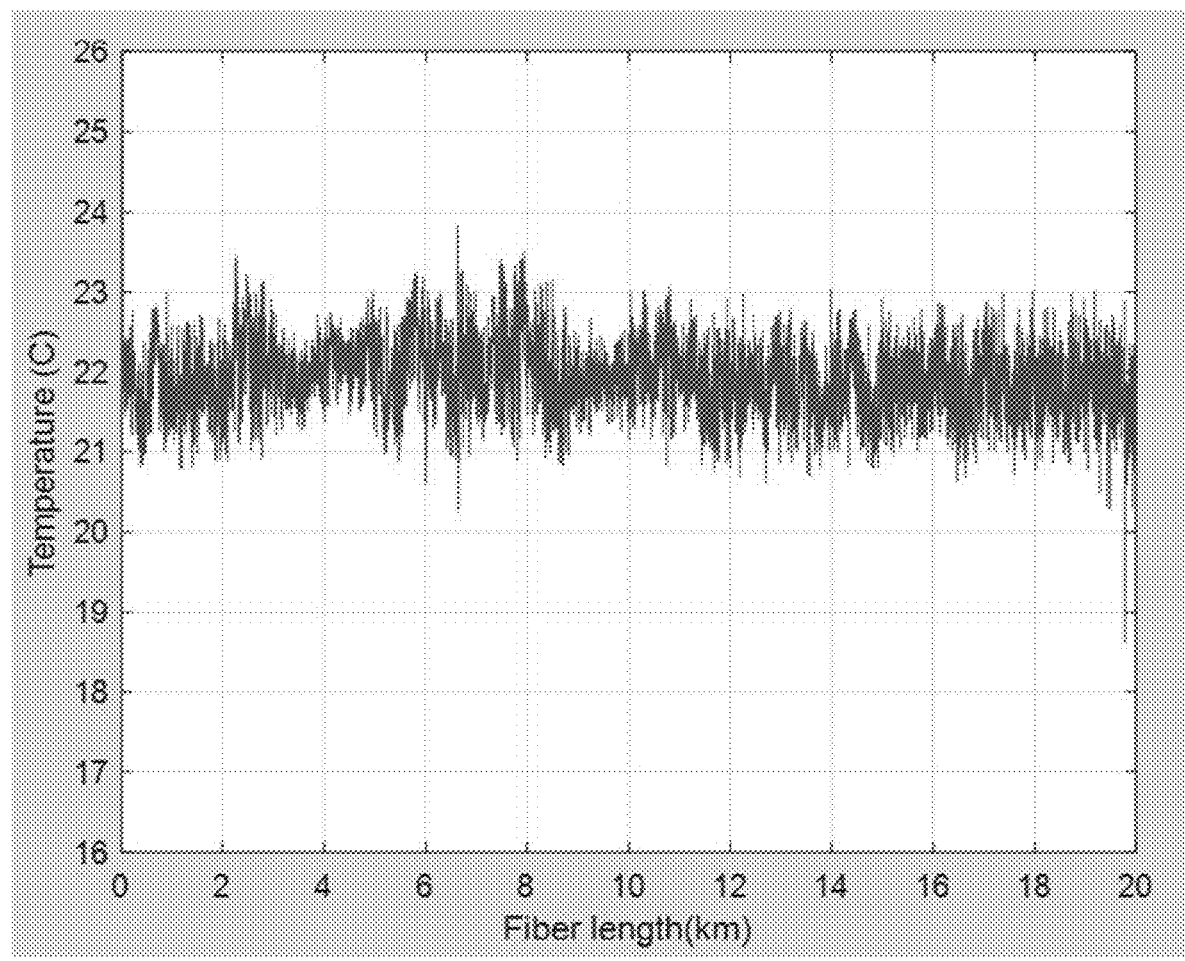
FIG. 9 is a plot of Temperature (° C.) vs. Fiber Length (km) showing an expanded view of the first 20 km result of FIG. 8 according to aspects of the present disclosure.

FIG. 8 is a pair of plots illustrating results produced from the configuration illustrated in FIG. 5 with a SLED according to aspects of the present disclosure. To obtain these results, we used the same number of averaging and denoising schemes as those used in producing the results of FIG. 2. The temperature noise in the initial 20 km length is substantially +/−1 C as shown in FIG. 9, which is a plot of Temperature (° C.) vs. Fiber Length (km) showing an expanded view of the first 20 km result of FIG. 8 (upper) according to aspects of the present disclosure.

To further evaluate our inventive configurations, we employed an ASE source in the configurations of FIG. 5 and FIG. 6 with 100 GHz DWDM filters. The results are shown graphically in FIG. 10, which shows a pair of plots illustrating results produced from the configurations illustrated in FIG. 5 (lower) and FIG. 6 (upper) with an ASE source according to aspects of the present disclosure.

Figure 10:
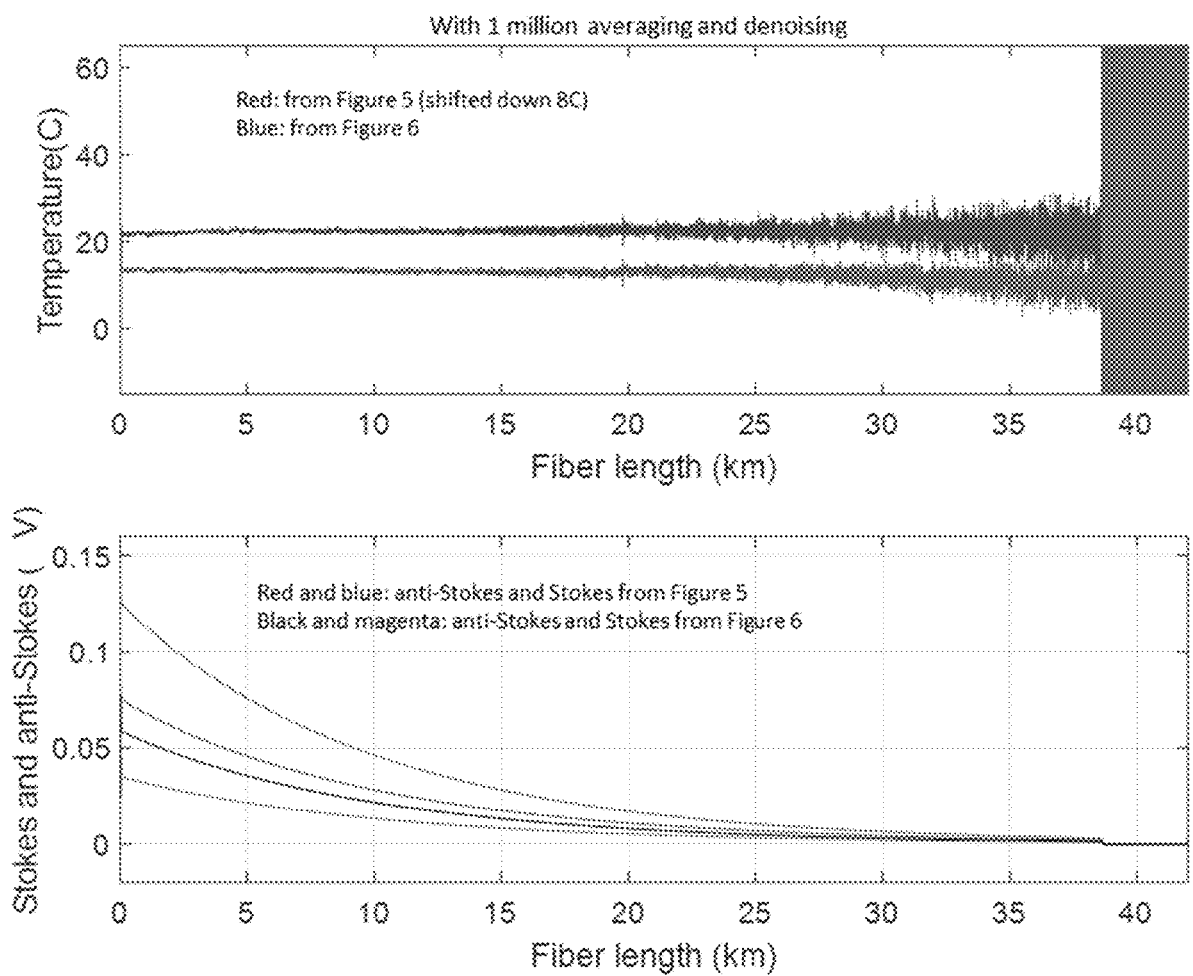
FIG. 10 is a pair of plots illustrating results produced from the configurations illustrated in FIG. 6 (upper) and FIG. 5 (lower) with an ASE source and DWDM filters according to aspects of the present disclosure.
Figure 11:
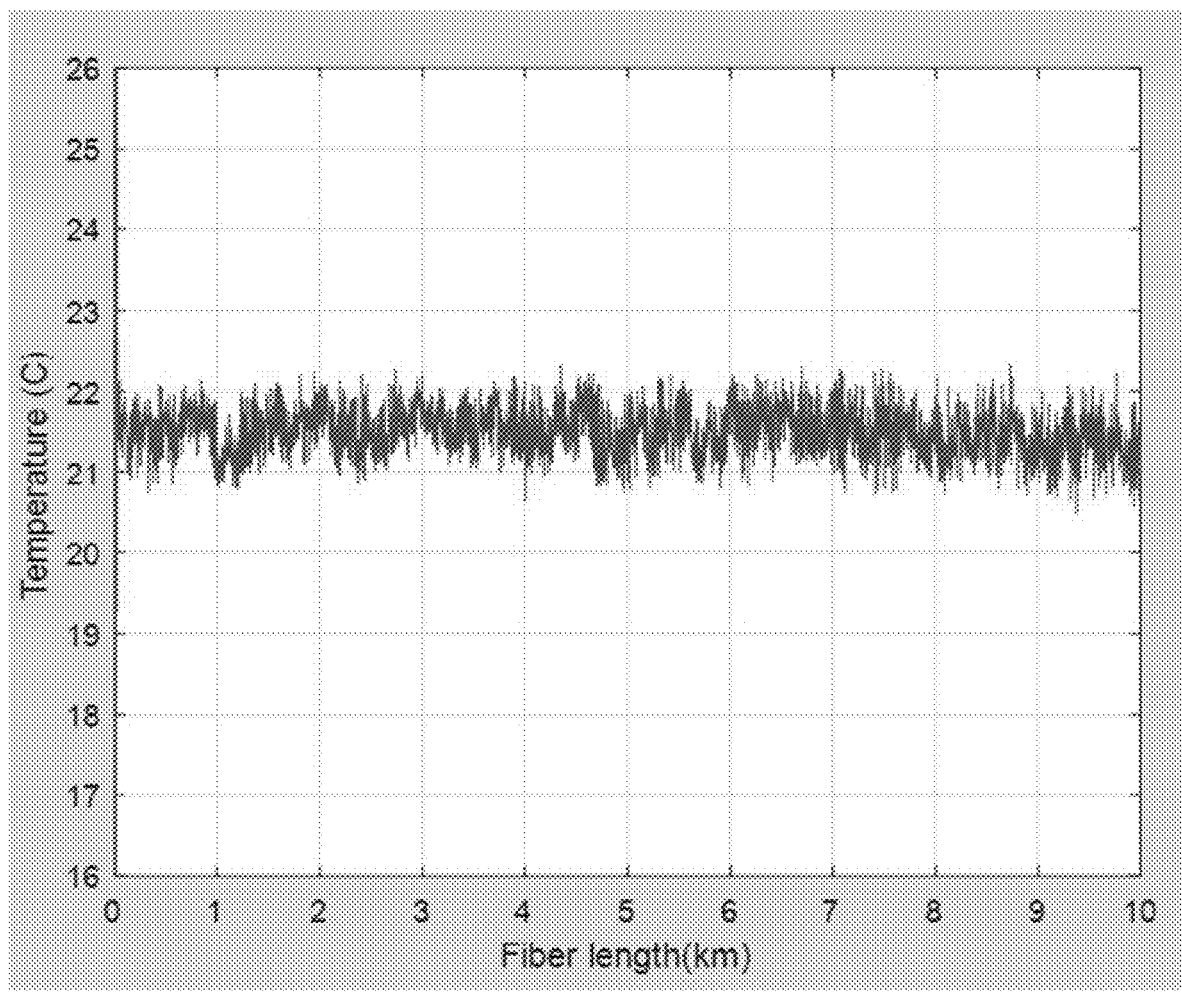
FIG. 11 is a plot of Temperature (° C.) vs. Fiber Length (km) showing an expanded view of the first 10 km result of FIG. 10 (lower) according to aspects of the present disclosure.

Note that temperature noises in the first 10 km of the fiber are similar in both configurations, and they are substantially +/−0.5 C as shown graphically in FIG. 11, which is a plot of Temperature (C) vs. Fiber Length (km) showing an expanded view of the first 10 km result of FIG. 10 according to aspects of the present disclosure. As may be observed—after 10 km—the result from the configuration of FIG. 5 is slightly better.

At this point we note further that while systems, methods, and structures according to aspects of the present disclosure significantly and surprisingly reduce temperature nose, there nevertheless exists some—a much smaller amount—of temperature noise which we believe may be due to our use of the high gain APD and analog to digital converters.

While we have presented this disclosure using some specific examples, those skilled in the art will recognize that our teachings are not so limited. Accordingly, this disclosure should be only limited by the scope of the claims attached hereto.

The invention claimed is:

1. A distributed temperature sensing (DTS) system comprising:
   a length of single-mode optical fiber; and
   an optical interrogator unit that generates optical pulses, introduces them into the optical fiber, receives backscattered signals from the optical fiber, and determines one or more temperatures at points along the optical fiber from the backscattered signals;
   the DTS system CHARACTERIZED BY:
   light comprising the optical pulses introduced into the single-mode optical fiber is generated by a light source selected from the group consisting of: superluminescent emitting diode(s) (SLEDs) and amplified spontaneous emission (ASE) source(s);
   a wavelength-division-multiplexing filter (WDM filter) interposed in an optical path between the light source and the optical fiber;
   a continuous wavelength erbium-doped fiber amplifier (CW EDFA) interposed in the optical path between the WDM filter and the optical fiber; and
   a second WDM filter interposed in the optical path between the CW EDFA and the optical fiber.

2. A distributed temperature sensing (DTS) system comprising:
   a length of single-mode optical fiber; and
   an optical interrogator unit that generates optical pulses, introduces them into the optical fiber, receives backscattered signals from the optical fiber, and determines one or more temperatures at points along the optical fiber from the backscattered signals;
   the DTS system CHARACTERIZED BY:
   light comprising the optical pulses introduced into the single-mode optical fiber is generated by a light source selected from the group consisting of: superluminescent emitting diode(s) (SLEDs) and amplified spontaneous emission (ASE) source(s);
   a wavelength-division-multiplexing filter (WDM filter) interposed in an optical path between the light source and the optical fiber;
   a continuous wavelength erbium-doped fiber amplifier (CW EDFA) interposed in the optical path between the WDM filter and the optical fiber;
   a second WDM filter interposed in the optical path between the CW EDFA and the optical fiber; and
   a semiconductor optical amplifier (SOA) interposed in the optical path between the second WDM filter and the optical fiber.

3. A distributed temperature sensing (DTS) system comprising:
   a length of single-mode optical fiber; and
   an optical interrogator unit that generates optical pulses, introduces them into the optical fiber, receives backscattered signals from the optical fiber, and determines one or more temperatures at points along the optical fiber from the backscattered signals;
   the DTS system CHARACTERIZED BY:
   light comprising the optical pulses introduced into the single-mode optical fiber is generated by a light source selected from the group consisting of: superluminescent emitting diode(s) (SLEDs) and amplified spontaneous emission (ASE) source(s);
   a wavelength-division-multiplexing filter (WDM filter) interposed in an optical path between the light source and the optical fiber;
   a continuous wavelength erbium-doped fiber amplifier (CW EDFA) interposed in the optical path between the WDM filter and the optical fiber;
   a second WDM filter interposed in the optical path between the CW EDFA and the optical fiber;
   a semiconductor optical amplifier (SOA) interposed in the optical path between the second WDM filter and the optical fiber; and
   an erbium-doped fiber amplifier interposed in the optical path between the SOA and the optical fiber.

* * * * *